Nov. 25, 1941.   W. G. TUEL ET AL   2,263,658
AUTOMATIC CONTROL SYSTEM FOR ACETYLENE GENERATORS
Filed Sept. 16, 1938   3 Sheets-Sheet 1

INVENTORS
WILLIAM G. TUEL
CHESTER A. SIVER
BY
ATTORNEY

Nov. 25, 1941.  W. G. TUEL ET AL  2,263,658
AUTOMATIC CONTROL SYSTEM FOR ACETYLENE GENERATORS
Filed Sept. 16, 1938  3 Sheets-Sheet 3

INVENTORS
WILLIAM G. TUEL
CHESTER A. SIVER
BY
ATTORNEY

Patented Nov. 25, 1941

2,263,658

UNITED STATES PATENT OFFICE 2,263,658

AUTOMATIC CONTROL SYSTEM FOR ACETYLENE GENERATORS

William G. Tuel and Chester A. Siver, Indianapolis, Ind., assignors to The Prest-O-Lite Company, Inc., a corporation of New York Application September 16, 1938, Serial No. 230,226

21 Claims. (Cl. 48—38)

This invention relates to the art of generating acetylene gas, and particularly to semi-automatic and completely automatic control systems for starting and stopping the operating units of an acetylene generating plant in accordance with a predetermined sequential order. While the invention may be applied to all types of acetylene generating plants in which the units may be operated by various known prime-movers, pneumatically or electrically controlled, the principles of the invention will be described in connection with a so-called "dry-generating" acetylene plant in which the units are driven and controlled electrically.

Usually, dry-generating plants include a calcium carbide hopper and means adapted to feed the carbide therefrom to a generating chamber to which water is fed in sufficient quantities only to completely react with the carbide to form acetylene and dry calcium hydroxide. The generator may be provided with an agitator adapted to thoroughly mix the carbide and water to effect maximum acetylene generation with a minimum volume of water. The generated gas may be conducted to a gas holder from which it may be withdrawn for commercial consumption. The dry calcium hydroxide may be withdrawn from the generator and collected in a lime-seal hopper from which it may be conveyed to a point of storage at a rate which will retain sufficient lime within the hopper to provide a seal, thus preventing any loss of acetylene from, or the entrance of any air into the generator through the lime discharge means.

In order to insure the efficient operation of, and to prevent dangerous conditions in plants of the above-outlined type, certain precautions must be observed which require starting the various operating units of the plant in accordance with a predetermined sequence. Likewise, a sequential order of stopping certain or all of these operating units is essential when the gas holder becomes filled, or when generation of gas is terminated. For these reasons, it has been found expedient to employ separate electrical control devices for the various generator operating units including a motor adapted to drive a conveyor for feeding the carbide from the hopper to the generator; an electrically operated device for controlling the flow of water to the generator; a motor for operating an agitator within the generating chamber; a motor for operating an agitator in the lime-seal hopper to insure the proper distribution of the dry lime which is fed thereto; and a motor for operating a conveyor which withdraws the lime from the lime-seal hopper and which delivers said withdrawn lime to the point of lime storage.

When the gas holder is empty, and it is desired to begin operating the system, it is necessary to initially start the lime-seal agitator motor before the dry lime is discharged into the lime-seal hopper, otherwise the agitator will not properly distribute the lime within the lime-seal hopper and hence the lime seal will not be formed. The generator agitator must be started before feeding calcium carbide and water to the generator, otherwise an unsuitable, wet, pasty product of calcium hydroxide will result. Additionally, the feeding of calcium carbide from the carbide hopper to the generator must precede the introduction of the water to the generator, otherwise an excess of water will be initially present when the carbide reaches the generator, and an improper, wet, pasty condition of the resulting calcium hydroxide will occur. Operation of the conveyor motor drive for the lime-seal hopper must be controlled in accordance with the level of the lime within the lime-seal hopper in order to maintain the seal of said hopper at all times.

When the gas holder has been filled with gas, or when acetylene generation is to be terminated, a different sequential order of stopping the various generator operating devices must be observed from that in starting said devices. Thus, the feeding of calcium carbide from the hopper to the generator must continue for a sufficient length of time after the carbide-hopper feed-valve is closed so that the conveyor will not trap calcium carbide within its housing. The flow of water to the generator and the operation of the generator agitator must continue for a sufficient length of time after the carbide-feed valve is shut off in order to thoroughly react the entire amount of carbide fed to the generator from within the carbide-feed-conveyor housing. In order to prevent excess accumulation of the dry lime within the lime-seal hopper, the operation of the lime-seal agitator as well as that of the lime-seal conveyor must continue until after the generator agitator has been stopped.

In such a system of interconnected electrically operated generator equipment many contingencies may arise, and provisions therefor must be employed in order to insure stopping of certain devices and continued operation of others when hazardous contingencies occur.

An object of this invention is to provide an acetylene generating plant and a control system for insuring the starting and stopping of various units of the plant in accordance with a predetermined sequential order.

Other objects of the invention include, the provision of such a plant in which a semi-automatic electrical control circuit is provided for insuring the proper sequential order of operation; the provision of such a semi-automatic control circuit in which certain of the electrically operated units must be started before others; the provision of such a semi-automatic control circuit in which certain of the electrically operated units are cut in and cut out of an electrical circuit in accordance with the mechanical operation of said units and independently of other electrically operated units of the generating plant; the provision of such a semi-automatic control circuit in which certain of the electrically operated units are controlled by a timing unit for insuring a definite timed relation between their starting and stopping, and in which the operation of the timing unit is dependent upon the mechanical operation of certain portions of the generating plant; the provision of such a semi-automatic control circuit including a timing unit, wherein stopping of the various operating units of the plant are effected in a sequential order different from that of starting said units; the provision of such a semi-automatic control circuit including a timing device for certain of the operating units of the plant, wherein said timing device is adapted to start and stop certain of said operating units during a complete cycle of its operation; and the provision of such a semi-automatic control circuit including audible means and safety features for insuring fool-proof operation of the generating plant.

Additionally, other specific objects of the invention include the provision of such a generating plant in which a fully automatic electrical control circuit is provided wherein a complete cycle of starting and stopping various operating units, in accordance with the order of operating said units as outlined in connection with the semi-automatic control, may be effected without the constant attention of an attendant; the provision of such a fully automatic electrical control circuit in which the starting of various operating units follows a different sequential order from that of stopping of said units, and wherein a series of timed relations are maintained between the successive starting of said units and the successive stopping of said units; and the provision of such a fully automatic control circuit including audible alarms, visible signals, and safety features for insuring fool-proof operation of the generating plant.

The above and other objects and novel features of the invention will become apparent from the detailed description in the following specification which refers to the accompanying drawings in which.

Figure 1:
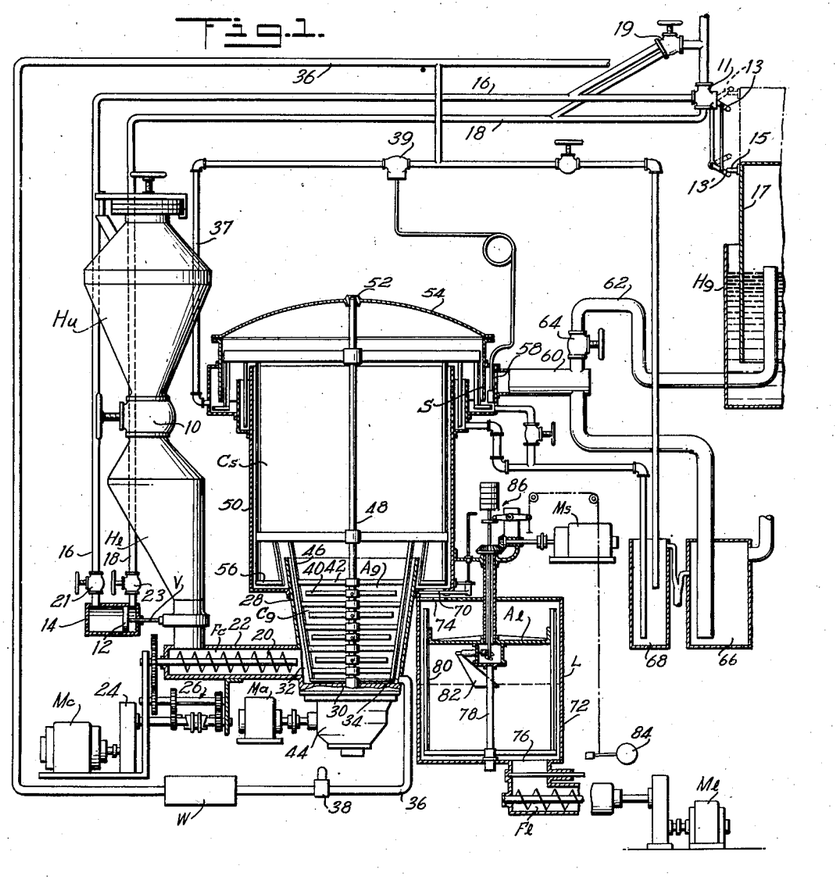
Fig. 1 is a somewhat schematic elevational view of an acetylene generating plant embodying the principles of the invention.

Referring to Fig. 1 of the drawings, the principles of the invention are shown as applied to a dry acetylene generating plant of the type shown, described and claimed in a copending application Serial No. 241,144, filed November 18, 1938, now Patent No. 2,233,109 dated February 25, 1941, which was a divisional application of a copending application Serial No. 103,526, filed October 1, 1936, in the name of Charles Ness and Hugo V. Kojola now Patent No. 2,233,108, dated February 25, 1941. The generating plant includes upper and lower carbide hoppers $H_u$ and $H_l$ and a pneumatically operated carbide feed-valve V adapted to control the flow of carbide to a screw conveyor $F_c$ which is driven by a motor $M_c$. The carbide conveyor is adapted to discharge the carbide into a generating chamber $C_g$ within which an agitator assembly $A_g$ is mounted for rotation by a motor $M_a$. The generating chamber $C_g$ is also provided with an inlet through which water is adapted to be introduced in controlled amounts through the operation of an automatically actuated water flow controller W which may be air-operated. A separating or dust-settling chamber $C_s$ is mounted above and in communicative registry with the generating chamber $C_g$. The acetylene gas generated within the chamber $C_g$ rises within chamber $C_s$ wherein any floating particles of dry calcium hydroxide separate or settle from the gas. The upper portion of the chamber $C_s$ is provided with a water-seal scrubbing device S which frees the gas from any solid particles that may not have separated or settled therefrom within chamber $C_s$. The scrubbed gas passes through a pipe system and enters a gas holder $H_g$ from which it may be withdrawn for commercial consumption.

The dry calcium hydroxide rises within the chamber $C_g$, overflows the same and discharges into an annular lime overflow located at the bottom of chamber $C_s$, from which the dry lime gravitates into a lime-seal hopper L. The residue-collecting means or hopper L is provided with an agitator assembly $A_l$ adapted to be rotated by a motor $M_s$. The dry lime within the hopper L is adapted to be discharged into the housing of a screw conveyor $F_l$ which latter is operated by a motor $M_l$ for conveying the dry lime to a storage point. The rotatable agitator assembly $A_l$ is provided with a lime level indicator which controls the operation of motor $M_l$ to thereby automatically retain at all times, a sufficient quantity of lime within hopper L to form a lime-seal and thus prevent any loss of acetylene from, or the entrance of any air into the generating chamber $C_g$ through the lime disposal apparatus.

The carbide hoppers $H_u$ and $H_l$ are located in substantially vertical alignment, with a gate valve 10 located at their communicating point. This arrangement of dual hoppers enables filling the upper hopper $H_u$ while the generator is operating without admitting air to the generator through the carbide feed apparatus.

The pneumatically operated carbide feed-valve V is in the form of a gate valve and is connected to a piston 12 within a cylinder 14. The cylinder 14 is provided with air lines 16 and 18 adapted to introduce air to opposite sides of the piston 12. A three-way operating valve 11 is connected to the lines 16 and 18, and this valve is actuated by a trip lever 13 adapted to be actuated by the movement of a lever 15 rigidly attached to a gas bell 17 of the holder $H_g$. The arrangement is such that when the holder is full of acetylene gas and at its upper position, the three-way valve 11 is operated to admit air to line 16 thus causing valve V to close; and when the holder falls to its low position due to acetylene consumption, the three-way valve 11 is actuated, by lever 15 striking lever 13′, to admit air to line 18 thereby effecting the opening of valve V.

Manual control of valve V may be effected independently of the movement or position of gas bell 17, by providing a second manually operable normally closed two-way valve 19 which shunts the three-way valve 11. Additionally, manually operable valves 21 and 23 may be provided in lines 16 and 18 for accomplishing this latter result.

The conveyor $F_c$ comprises a screw 20 within a housing 22 which latter opens into the bottom of chamber $C_g$. The conveyor screw 20 is adapted to be driven at variable speeds by the motor $M_c$ through a speed reducer 24 and a gear train designated generally by the numeral 26.

The acetylene generating chamber $C_g$ comprises a frustro-conical container 28, open at its top and closed at its bottom by wall 30. An opening 32 is provided at the bottom of the side wall of chamber $C_g$ in alignment with the discharge end of the housing 22. Another opening 34 is provided in the side wall of chamber $C_g$ adapted to receive the end of a water supply pipe 36. The amount of water introduced into the chamber $C_g$ is only sufficient to completely react the carbide fed into said chamber and to dissipate by its evaporation excess heat produced by the reaction, as is well known in the so-called "dry-generating" process. Control of the amount and rate of flow of water entering reaction chamber $C_g$ is maintained by including an air-operated water flow controller W in the main water line 36, while a solenoid-operated valve 38 is provided in the line 36 for starting and stopping the flow of water into the generating chamber.

Agitation of the mixture of calcium carbide and water within chamber $C_g$ is effected by the agitator assembly $A_g$. It comprises a series of alternately arranged, vertically spaced, oppositely rotatable paddles 40 and 42 which are driven by the motor $M_a$ through a double-motion gear train within a gear box 44. The paddles 42 are connected to a rotatable frame 46 and are journaled on a vertically disposed shaft 48; while the paddles 40 are fixed to and rotate with shaft 48. The arrangement is similar to that disclosed in the copending applications (now patents) of Ness and Kojola previously referred to.

The separating, or dust-settling chamber $C_s$ comprises a substantially cylindrical shell 50 located above the chamber $C_g$. The rotatable shaft 48 extends upwardly through chamber $C_s$ and is journaled in a bearing 52 mounted on a cover 54. The cover 54 encloses the upper open end of chamber $C_s$, and forms a baffle with the gas scrubbing apparatus S, as specifically described in the previously referred to applications of Ness and Kojola. A scraper assembly 56 is mounted within chamber $C_s$. It is fixed to, and rotates with shaft 48 during operation of the agitator assembly $A_g$. Acetylene gas arising within chamber $C_s$ is freed from heavy particles of dry lime; and any small particles of solid material that do not separate within said chamber are removed from the gas as it passes through the scrubber S. The scrubber S is adapted to receive a continuous supply of fresh water from the main water line 36 through line 37; its rate of flow being controlled by a temperature-control valve 39. The upper portion of chamber $C_s$ is provided with an opening 58 through which the scrubbed gas passes to the conduit 60. Gas within conduit 60 is fed through a valve 64 thence to passage 62 which leads to the gas holder $H_g$. A safety-relief vent 66 is provided in the conduit 60, and an overflow 68 is connected to the scrubber S. Both the vent 66 and overflow 68 are adapted to respectively release acetylene pressure and discharge excess water from the conduit 60 and the scrubber S without permitting the introduction of air to the generator.

The bottom of chamber $C_s$ is provided with a lime withdrawal opening 70 adapted to open into the lime-seal hopper L. The lime-seal hopper L comprises an outer cylindrical shell 72 having an inlet 74 aligned with opening 70 in chamber $C_s$, and a lime outlet 76 located in its bottom wall. The lime-agitator assembly or stirring means $A_l$ is located within the hopper L and comprises a vertically disposed rotatable shaft 78, to which a lime-agitator frame 80 is rigidly secured. A lime-level indicator 82 is connected to the lime-agitator frame 80 and its vertical movement is transmitted to a mercury switch 84 through a counter-weighted lever system 86.

The dry lime from hopper L is withdrawn by conveyor $F_l$ at a rate which insures maintaining at all times sufficient lime within hopper L to provide an effective seal to prevent the entrance of air to the generator. The conveyor $F_l$ is operated by the motor $M_l$, which latter is controlled by the lime-level indicator 82 through the mercury switch 84. The lime-agitator frame 80 is rotated by the motor $M_s$. The details of the lime-agitator assembly, lime-hopper assembly, and lime-conveyor motor control are specifically described and claimed in copending application Serial No. 234,546, filed October 12, 1938, in the names of Charles Ness, Hugo V. Kojola, and Guy A. Dunn.

As previously stated, it is necessary to maintain sufficient lime at all times within the lime hopper L to provide an adequate seal. Therefore, when it is desired to begin generating acetylene it is necessary to initially start motor $M_s$, the drive for the lime indicator 82, and to place in condition for operation, the motor $M_l$ which latter drives the lime conveyor $F_l$ and the operation of which is controlled by the indicator 82 through the mercury switch 84.

Figure 2:
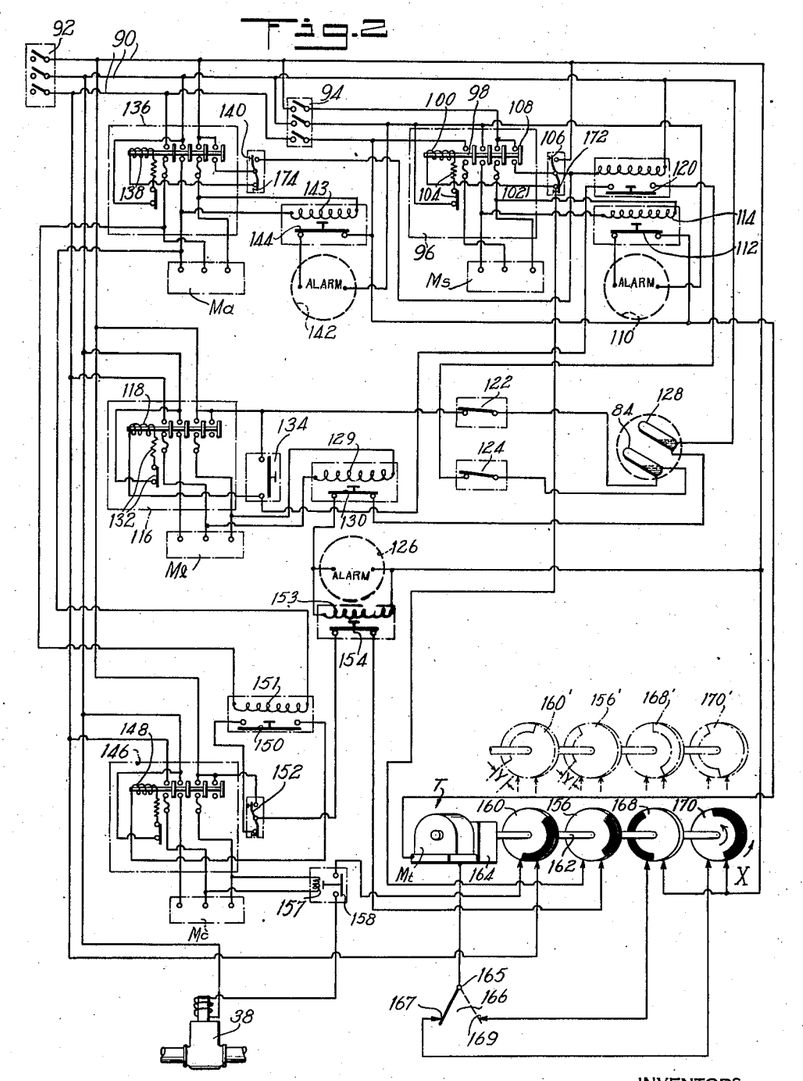
Fig. 2 is a wiring diagram illustrating one form of a semi-automatic electrical control circuit for the various electrically operated units of the generating plant shown in Fig. 1.

Referring to Fig. 2 of the drawings, a three-phase main line 90 is adapted to be completed or interrupted by a manually operable switch 92. The lime-seal agitator motor $M_s$ is adapted to be connected across the main line 90 through another manually operable switch 94. A relay 96 is provided between the motor $M_s$ and the line 90. It comprises a magnetically operated switch 98 adapted to be closed upon energization of a holding coil 100 located in a circuit 102. The circuit 102 includes an overload relay 104 adapted to open switch 98 in the event motor $M_s$ is overloaded, or fails to start for any reason. Additionally, circuit 102 includes a momentary contact push-button switch 106 which must be momentarily closed to complete the circuit 102 to thereby close switch 98 and consequently start motor $M_s$. After the switch 98 is closed, the circuit 102 remains complete even though push-button switch 106 opens, since a contact 108 of switch 98 provides a holding circuit for the relay.

An alarm 110 is connected across the main line 90 which sounds upon closing of switches 92 and 94. The circuit for alarm 110 includes a normally closed electromagnetic switch 112, the solenoid 114 of which is in circuit with motor $M_s$. Thus, upon completing the circuit of motor $M_s$ by closing switch 106, solenoid 114 is energized and opens switch 112 thereby shutting off alarm 110.

The lime-conveyor motor $M_l$ must be in condition to operate when motor $M_s$ starts in order to maintain the correct level of lime within lime-seal hopper L. Thus, motor $M_l$ is likewise connected across the main line 90 with a relay 116 between it and the line. Relay 116 is similar to relay 96 except that the circuit for its holding coil 118 includes a normally open magnetically operated switch 120, the solenoid of which is in the holding coil circuit of switch 98 including contact 108. Additionally the circuit for holding coil 118 includes two manually operable normally closed switches 122, 124 which are safety devices adapted to be opened only when an emergency arises due to the improper action of the motor $M_l$. The circuit for holding coil 118 also includes the mercury switch 84 which is opened or closed in accordance with the level of the lime within hopper L as previously explained (see Fig. 1).

A second alarm 126 is connected across the main line 90 through a mercury switch 128 which latter is adapted to be operated with mercury switch 84, and also through a normally closed magnetically operated switch 130. The circuit for the solenoid 129 of switch 130 is connected across the line of motor $M_l$. Thus, starting of motor $M_s$ closes switch 120 and completes the circuit for holding coil 118 so long as switches 122, 124 and 84 are closed. Under such conditions, motor $M_l$ starts and switch 130 opens, thus stopping alarm 126 which has been ringing with alarm 110 when the main circuit 90 was completed. If, however, the lime level indicator 82 (Fig. 1) is below the normal lime level in hopper L, both mercury switches 84 and 128 will be open, the motor $M_l$ will not start, and alarm 126 will not sound. However, if the indicator 82 is above the normal lime level, switches 84 and 128 will be closed, motor $M_l$ will start whereupon alarm 126 will be cut out by the opening of switch 130. It is to be noted that should motor $M_l$ fail to start for any reason when it should, an overload relay 132 in circuit with holding coil 118 will open relay 116 without interfering with the continued operation of motor $M_s$, and upon opening of relay 116 alarm 126 begins to sound, thus indicating to the operator that the motor $M_l$ is abnormal.

During periods of overhauling and maintenance work, it is often necessary to control the operation of motor $M_l$ independently of the circuit through holding coil 100 of motor $M_s$ and the circuit through mercury switch 84. Provision has been made for this contingency by providing a manually operable switch 134 in the circuit of holding coil 118 which shunts switches 84 and 120. The switch 134 is locked in open position during normal operation of the generator.

It is necessary to start the generator agitator motor $M_a$ after the motors $M_s$ and $M_l$ have been started, and before feeding carbide and water to the generator. The former step of this sequence is necessary because otherwise the hopper L would be subjected to improper filling, thus impairing its sealing effect. The latter step of this sequence is necessary because the carbide and water must be continuously agitated as they come into contact, otherwise an improper lime product will result. The above sequential steps are insured by this invention. The motor $M_a$ is connected across the main line 90 through a relay 136 similar to relays 96 and 116, including a push-button switch 140. The circuit for the holding coil 138 of relay 136 is connected to line 90 through contact 108 of switch 98, and until switch 98 is closed, closing of switch 140 will be ineffective to start motor $M_a$. A third alarm 142 is connected to the main line 90 through a normally closed magnetically operated switch 144, the solenoid circuit 143 of which is connected across the line of motor $M_a$. Thus, closing of switch 140 will start motor $M_a$ and stop alarm 142 only if switch 98 for motor $M_s$ is closed.

The feeding of carbide and water to the generating chamber $C_g$ must occur only when all other units of the plant are functioning or are in condition to function in accordance with the previously outlined sequence of operation. Furthermore, the feeding of carbide and water should be interrupted if any of the other units fail to function. Additionally, when the carbide feed valve V is closed due to the gas bell 17 of gas holder $H_g$ reaching its upper limit, the carbide feed motor $M_c$ and the operation of the water valve 38 should continue until the carbide screw housing 22 has been emptied— they should then be stopped simultaneously. Furthermore, when the carbide feed valve V is opened due to the gas bell 17 of gas holder $H_g$ reaching its lower limit, the carbide feed motor $M_c$ should be started some minutes before the water feed valve 38 is opened, because it has been found that better results can be obtained by insuring the presence of a substantial amount of carbide in the generating chamber before feeding water thereto.

In order to accomplish the above results, the carbide feed motor $M_c$ and the solenoid for the water valve 38 have been interconnected with the previously described circuit and with a timing motor control T.

The carbide feed motor $M_c$ is connected to the main line 90 through a relay 146 similar to relays 96, 116 and 136. The circuit for the holding coil 148 of relay 146 includes a normally open magnetic switch 150, the solenoid 151 of which is connected in the circuit of motor $M_a$. Thus the starting of motor $M_c$ requires motor $M_a$ to be operating. The circuit for coil 148 also includes a momentary push-button switch 152 normally not used during operation of the plant, and employed only during periods of maintenance and repair. In order to insure stopping of the motor $M_c$ in the event the lime-seal conveyor motor $M_l$ stops, the circuit for holding coil 148 also includes a normally closed magnetic switch 154, the solenoid 153 of which is connected to the circuit of alarm 126. The latter alarm circuit includes magnetic switch 130 having its solenoid 129 connected across motor $M_l$. Therefore, magnetic switch 154 opens if motor $M_l$ stops, thus effecting the stopping of motor $M_c$.

The circuit of coil 148 also includes a cam-operated switch 156, forming a part of the timing control T. This circuit extends from control T to line 90 through the closed portion 172 of switch 106 and the contact 108 of relay 96, thereby requiring motor $M_s$ to be operating as a prerequisite to the operation of motor $M_c$.

The solenoid for water valve 38 is connected across the main line 90 through a normally open magnetic switch 158, the holding coil 157 of which is connected across the circuit of the carbide feed motor $M_c$. Additionally, the circuit for valve 38 extends through a cam-operated switch 160, forming another part of the timer T, thence to the main line 90.

The timing control T comprises a timing motor $M_t$ geared to a shaft 162 through a speed reducing unit 164. In the present embodiment of the invention, shaft 162 is geared to complete one revolution in ten minutes. The timing motor $M_t$ is connected across the main line 90 through a two-way oscillatable switch 166 and through the switch 94. Oscillatable motion is imparted to the switch 166 by the action of valve V which action in turn is controlled by the upper and lower limits of the gas bell 17 of gas holder $H_g$. A pair of cam-operated switches 168, 170 mounted on shaft 162 are alternately adapted to start the timing motor $M_t$, and maintain its continuous operation for a definite time limit, depending upon the position of oscillatable switch 166. Thus, one side of the timing motor $M_t$ is connected to the main line 90 through the switch 94, while the other side of said motor is connected to a common point 165 on the two-way switch 166. One side 167 of two-way switch 166 is connected to line 90 through the cam-operated switch 170. The other side 169 of two-way switch 166 is connected to one pole of switch 168, the other pole of which is wired to main line 90. All of the switches 156, 160, 168 and 170 are provided with segmental contact portions represented by the plain portions of the switches. The arrangement and design of the segmental contact portions of switches 168 and 170 are such that each is alternately adapted to complete the circuit of motor $M_t$ for one-half a revolution of shaft 162. As the one switch opens, the other closes. The segmental contact portions of switches 156 and 160 are so arranged that when switch 156 is in initial position to complete the circuit for the holding coil 148 and relay 146 of motor $M_c$, the circuit of solenoid valve 38 through switch 160 is still open, and the latter closes, commencing the feed of water to chamber $C_g$, after a few minutes of operation of the carbide feed motor $M_c$.

Assume that the gas bell 17 of gas holder $H_g$ is in its lower position and that it is desired to start the generating plant. Switches 92 and 94 in the main line 90 are first closed. This causes alarms 110, 126 and 142 to sound. Push-button switches 106 and 140 are closed in the order named thus starting lime-agitator motor $M_s$, lime-conveyor motor $M_l$, and generator agitator motor $M_a$ in the order named, and stopping the alarms 110, 126 and 142. Since the gas bell 17 is at its lower limit, valve V will open due to the action of lever 15 on lever 13' thus causing switch 166 to assume the position shown in solid lines, and switches 156, 160, 168 and 170 will be in the position shown in Fig. 2 of the drawings. Thus it is apparent that the circuit for motor $M_t$ to main line 90 is completed through switch 170, and motor $M_t$ drives shaft 162 in the direction of the arrow X for one-half revolution until the circuit is broken by the opening of switch 170. While shaft 162 moves through its half revolution, the circuit for motor $M_c$ is completed through switch 156 for a definite time interval before the circuit for valve 38 is completed through switch 160. At the end of this half revolution of shaft 162, the segmental contact portions of switches 168 and 170 assume the position of switches 168' and 170', wherein switch 168' is in position to complete the circuit of motor $M_t$, except that two-way switch 166 must be moved to its dotted line position. The two other switches 156 and 160 then assume the position of switches 156', 160'. In the position of switches 156', 160', 168' and 170', generation of acetylene continues until the gas holder $H_g$ is filled with acetylene, and the gas bell 17 arrives at its upper limit thus moving three-way valve 11 to direct air under pressure into line 16 of cylinder 14 and thereby effecting the closing of valve V. The motion of valve V in closing moves switch 166 to its position in dotted lines thus re-starting timing motor $M_t$ by completing its circuit through switch 168'. Since carbide feed valve V is now closed, a portion Y of the segmental contacts of switches 156' and 160' maintains the operation of carbide feed motor $M_c$ and the continuous feed of water to the generating chamber $C_g$. The extent of portion Y is sufficient to insure the operation of motor $M_c$ and valve 38 until all carbide within conveyor housing 22 has been delivered to chamber $C_g$ and completely reacted with water to form acetylene. The operation of motor $M_t$ continues after the switches 156' and 160' open, to complete a single revolution of shaft 162 thereby re-setting the time control device T in position to re-commence its cycle of operation. When the gas within the gas holder $H_g$ has been consumed, and the bell 17 falls again to its lower position, valve V is again opened thus moving switch 166 again to its position shown in solid lines and thereby starting timing motor $M_t$ on another cycle of its operation.

Closing and opening of valve V, and consequently stopping and starting motor $M_c$ and valve 38 is continued so long as the consumption of acetylene gas causes the bell 17 to move between its lower and upper limits. During these intermittent operations of the carbide and water feed, the lime-seal agitator assembly $A_l$ and the generator agitator assembly $A_g$, operate continuously, and the lime-conveyor motor $M_l$ operates intermittently in accordance with the level of the lime within hopper L.

When it is desired to shut down the generating plant for an extended period, say for overnight, the operator need only close the valve V by manipulating the manually operable valves 19, 21, and 23 in the air lines 16 and 18. This action sets the timing device T into operation to stop motor $M_c$ and close water valve 38. Then the operator opens portions 172 and 174 of push-button switches 106 and 140 thereby stopping motors $M_s$, $M_l$ and $M_a$ in the order named and causing the alarms 110, 126 and 142 to sound. Opening of switches 92 and 94 causes the alarms to stop sounding, and the plant is completely shut down.

From the foregoing description, it is apparent that a semi-automatic electrical control circuit has been provided for an acetylene generating plant wherein a definite sequential order of starting and stopping, and of timing the operation of various units of the plant has been provided.

The previously described generating plant may be provided with a completely automatic electrical control system which will follow a similar sequential order of operation as set forth in connection with the semi-automatic electrical control system of Fig. 2.

Figure 3:
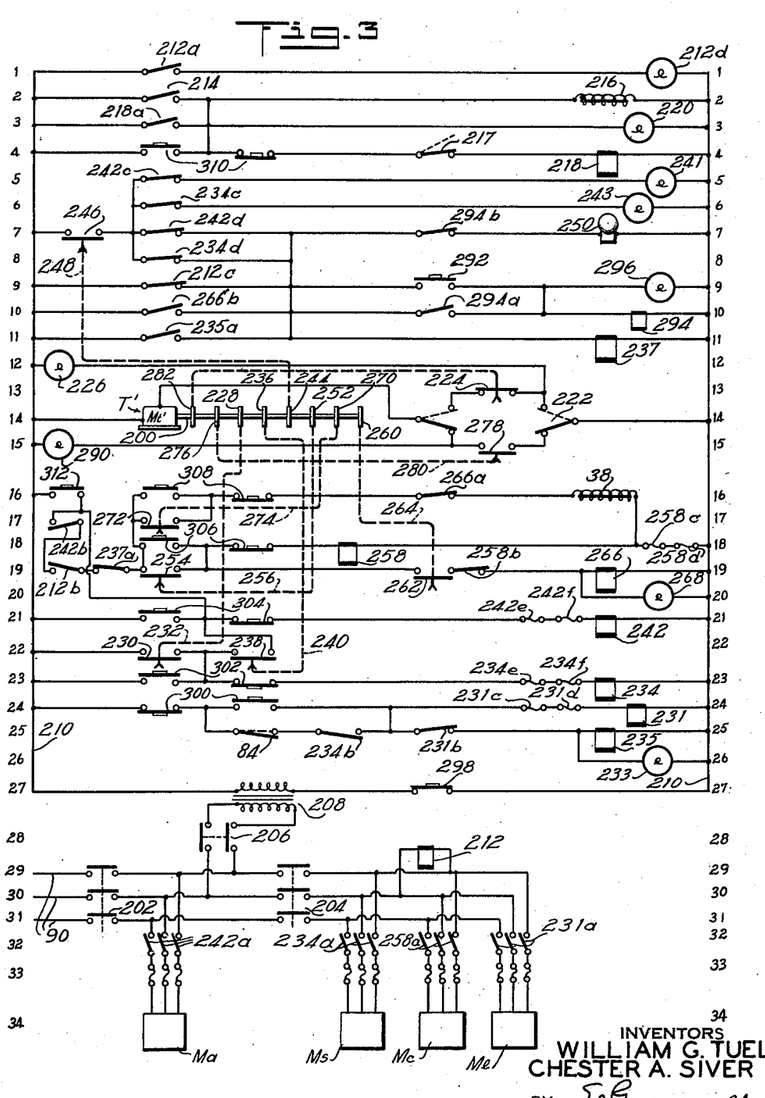
Fig. 3 is a wiring diagram illustrating one form of a fully automatic electrical control circuit for the various operating units of the generating plant shown in Fig. 1.

Fig. 3 of the drawings illustrates a wiring diagram for effecting complete automatic control of the various electrically operated units of the generating plant. Due to the rather complex nature of the circuit, Fig. 3 includes along its sides, a vertically arranged set of indices for facilitating describing the circuit.

Figure 4:
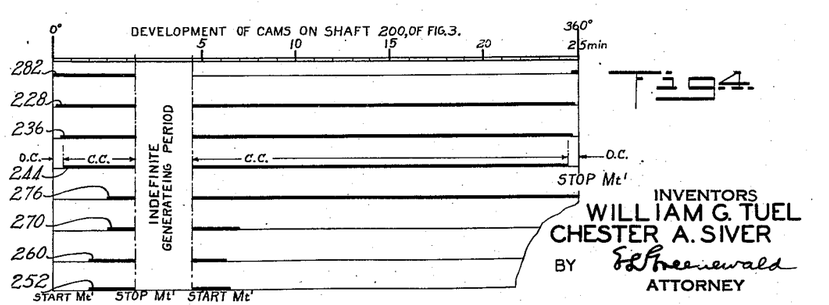
Fig. 4 is a diagram representing the cam development of a portion of the invention.

The circuit of Fig. 3 includes in line 14, a time cycle controller T' comprising a motor $M_t'$ geared to a shaft 200 to which are fixed eight controller cam switches, the cam surfaces of which are shown in developed form in Fig. 4. The motor $M_t'$ may drive shaft 200 at any desired rate, and in the present embodiment, it effects a single revolution of shaft 200 in about twenty-five minutes. During a single cycle of revolution, the eight switches on shaft 200 are adapted to set into operation and stop the various operating units of the generator plant in accordance with any predetermined timed sequence. Briefly, the accomplishments of this circuit are as follows:

As the carbide feed valve V opens when the bell 17 of gas holder $H_g$ reaches its lower limit, timing motor $M_t'$ is set into motion. The eight controller switches on shaft 200 may be set to successively start the various operating units of the generator plant in accordance with a determined sequential order and predetermined timed relation. While the specific timing of the starting and stopping of the various units may vary within appreciably wide limits, the following arrangement has been found to be completely satisfactory, and is given merely as an illustration of one specific arrangement of the cams on shaft 200. It is to be understood that other timing relations may be effected by adjusting the eight cams on shaft 200. According to one specific arrangement of the cams on shaft 200, the following schedule will prevail:

a. Ten seconds after the motor $M_t'$ begins to operate, the lime-agitator motor $M_s$ will be started, and the lime-conveyor motor $M_l$ will be operated in a manner similar to that previously explained to maintain the lime level in hopper L at a definite height.

b. Ten seconds later, the generator agitator motor $M_a$ will be set into operation.

c. One and one-half minutes later, the carbide feed motor $M_c$ will be set into motion.

d. One and one-half minutes later the valve 38 will be opened to admit water to the generating chamber $C_g$.

e. One minute later, the motor $M_t'$ stops.

Upon completion of the foregoing schedule, it is apparent that the generating plant is set into operation to generate acetylene. When the gas bell 17 of gas holder $H_g$ becomes filled with gas and reaches its upper limit, valve V will be closed as previously described. The closing of valve V re-starts the motor $M_t'$ to complete the operating cycle of the timer control T' to thereby shut down the generating plant as follows:

a. Two minutes after motor $M_t'$ has been re-started, carbide feed motor $M_c$ will be stopped.

b. One-half minute later, solenoid water valve 38 will be closed.

c. Seventeen minutes later, generator agitator motor $M_a$ will stop.

d. One-quarter minute later, lime-agitator motor $M_l$ will stop.

e. One-quarter minute later, the motor $M_t'$ will stop.

As the motor $M_t'$ finally stops, the eight switches on shaft 200 will be in position to repeat the above-described complete cycle of setting the generator plant into operation and stopping the same.

Certain safety features are combined in the circuit of Fig. 3 for the following purposes:

1. If motor $M_s$ stops for any reason, the carbide feed motor $M_c$ will stop, valve 38 will close, and an alarm will sound.

2. If motor $M_a$ should stop for any reason, the motor $M_c$ will stop, valve 38 will close, and an alarm will sound.

3. If the motor $M_c$ should stop for any reason, valve 38 will close and an alarm will sound.

4. If the motor $M_l$ fails to start when the lime level in hopper L reaches its upper limit, the motor $M_c$ will stop, valve 38 will close, and an alarm will sound.

Referring to Fig. 3, and the index on the sides of the drawings, motors $M_a$, $M_s$, $M_c$ and $M_l$ (line 34) are shown connected across the main line 90. The automatic control system is placed into operation by closing circuit breakers 202, 204 (line 31), and circuit breaker 206 (line 28). Closing the circuit to transformer 208 (line 27) impresses 110 volts across the lines 210. Relay 212 (line 28) has been energized by closing circuit breakers 202 and 204. It comprises two normally open contacts 212a, 212b (lines 1 and 19 respectively), and a normally closed contact 212c (line 9). Upon energization of relay 212, therefore, contacts 212a, 212b close, and 212c opens. When contact 212a (in line 1) closes, a red signal light 212d (in line 1) lights indicating to the operator that the control system is energized and ready for operation.

When the bell 17 of gas holder $H_g$ drops to its lower limit due to acetylene consumption, limit switch 214 (line 2) closes, thereby energizing solenoid valve 216 (line 2), energizing relay 218 (line 4) and illuminating green light 220 (line 3). Relay 218 comprises normally open contact 218a (line 3), which will close upon energization of said relay, and serve as an interlock to maintain solenoid valve 216 (line 2) energized after switch 214 opens when the bell 17 begins to rise.

Solenoid valve 216 (line 2) controls the flow of compressed air to cylinder 14 through lines 16 and 18 (see Fig. 1) and when energized, valve 216 directs this air to line 18 thereby forcing carbide feed valve V to its open position. This movement of valve V trips the double-pole, double-throw limit switch 222 (line 14) to its "dotted line" position, thus completing the circuit of motor $M_t'$ through normally closed, mechanically openable switch 224, whereupon timing motor $M_t'$ begins to operate, and a blue signal light 226 (line 12) becomes illuminated.

About ten seconds after motor $M_t'$ starts, cam 228 (line 14) on shaft 200 closes switch 230 (line 22) through a mechanical intercontrol 232 shown in dotted lines. Closing of switch 230 energizes a holding coil of an automatic motor-starter-relay 234 (line 23). Relay 234 includes contacts 234a (line 32), and energization of the coil of relay 234 closes these contacts 234a to set motor $M_s$ into operation. Motor starter relay 234 also includes normally open interlock contact 234b (line 25) as well as normally closed interlock contacts 234c and 234d (lines 6 and 8 respectively), the former of which closes and the latter two of which open when the holding coil of relay 234 is energized. Relay 234 also includes thermal overload relays 234e and 234f (line 23).

When motor starter relay 234 (line 23) becomes energized, interlocked contact 234b (line 25) is closed. Therefore, when the level of the lime in the lime hopper L (see Fig. 1) reaches its upper limit, switch 84 (line 25) will close, and automatic motor starter relay 231 (line 24) will be energized. Relay 231 includes contacts 231a (line 32) which will close upon energization of relay 231 to thereby start line conveyor motor $M_l$. Additionally, the relay 231 includes normally closed contact 231b (line 25) which will be opened upon the energization of relay 231. When the line level within the hopper L has been lowered to its lower limit, switch 84 (line 25) will be opened, thereby shutting off motor M₁.

Twenty seconds after motor Mt' begins to operate, cam 236 on shaft 200 closes switch 238 (line 22) through the mechanical interlock 240 shown in dotted lines. A holding coil of automatic starter relay 242 (line 21) thereupon becomes energized. Relay 242 includes main contacts 242a (line 32) of motor Ma (line 34) and upon energization of the holding coil of relay 242, contacts 242a close thus starting the generator agitator motor Ma. Relay 242 also contains normally open interlock contact 242b (line 17) and normally closed interlock contacts 242c and 242d (lines 5 and 7 respectively). Upon energization of the holding coil of relay 242, contact 242b closes and contacts 242c and 242d open. Relay 242 is provided with thermal overload relays 242e and 242f (line 21).

Thirty-five seconds after motor Mt' starts, cam 244 on shaft 200 closes switch 246 (line 7) through interlock 248. Thereafter, alarm 250 (line 7) will sound, and the amber signal light 241 (line 5) or the green signal light 243 (line 6) will be illuminated if the holding coils of the automatic motor starter relay 242 (line 21) or 234 (line 23) respectively become de-energized.

Approximately one minute and fifty seconds after motor Mt' starts, cam 252 on shaft 200 closes switch 254 (line 19) through the mechanical interlock 256. Closing of switch 254 energizes the holding coil of a third motor starter relay 258 (line 18). The relay 258 includes the main motor contacts 258a (line 32) of the carbide feed motor Mc (line 34). Relay 258 also includes normally closed interlock contact 258b (line 19) which opens upon energization of the holding coil of said relay. It also includes two thermal overload relays 258c, 258d (line 18).

About two minutes and five seconds after motor Mt' starts, cam 260 on shaft 200 (line 14) closes switch 262 (line 19) through the interlock 264 shown in dotted lines. Thereupon relay 266 (line 19) will become energized and a white light 268 (line 20) will become illuminated if automatic starter relay 258 should become de-energized due to its thermal overload relays 258c or 258d (line 18) opening, or to its holding coil burning out. Relay 266 includes a normally closed interlock contact 266a (line 16) for a purpose to be described later. Additionally, relay 266 includes normally open contact 266b (line 10), and upon the de-energizing of relay 258, contact 266b will close causing alarm 250 (line 7) to sound.

About three minutes and twenty seconds after motor Mt' starts, cam 270 on shaft 200 operates to close switch 272 (line 17) through the interlock 274 shown in dotted lines. Closing of switch 272 energizes the solenoid water valve 38 (line 16), causing it to open and feed water to the generating chamber Cg. (Fig. 1.) Thereupon, if relay 258 becomes de-energized, contact 266a will open thereby closing the valve 38 (line 16) and shutting off the water supply to chamber Cg. (Fig. 1.)

Shortly after switch 272 (line 17) is closed, cam 276 on shaft 200 operates to close switch 278 (line 15) through the interlock 280 shown in dotted lines.

Four and one-half minutes after motor Mt' starts, cam 282 on shaft 200 operates to open normally closed switch 224 (line 13) through the mechanical intercontrol 284 shown in dotted lines, thereby stopping the motor Mt' after the entire generating plant of Fig. 1 has been put into operation.

When the bell 17 of the gas holder Hg reaches its upper limit, normally closed switch 217 (line 4) will be opened by the action of levers 15 and 13' (Fig. 1). Opening of switch 217 causes the de-energizing of relay 218 (line 4), which in turn will open contact 218a (line 3). The green signal light 220 (line 3) will then be extinguished, and the solenoid valve 216 (line 2) will be de-energized. De-energization of the solenoid valve 216 causes compressed air to be admitted to pipeline 16 of cylinder 14 to thereby effect closing of the carbide feed valve V (see Fig. 1). The closing motion of valve V will cause limit switch 222 (line 14) to trip to the "solid line" position and since switch 278 (line 15) has been previously closed, the motor Mt' of the time controller T' will be re-started, the blue signal light 226 (line 12) will be extinguished, and the amber signal light 290 (line 15) will be illuminated.

One and one-half minutes after the motor Mt' has been re-started, cam 260 on shaft 200 will open switch 262 (line 19). After an additional one-half minute interval, cam 252 on shaft 200 (line 14) will open switch 254 (line 19). Opening of switch 254 causes the de-energization of automatic starter switch relay 258 (line 18), thus contacts 258a (line 32) of the relay 258 will open and stop the carbide feed motor Mc (line 34).

Two and one-half minutes after the re-starting of motor Mt', cam 270 on shaft 200 will open switch 272 (line 17) thereby de-energizing the solenoid water valve 38 (line 16), effecting its closing and thereby shutting off the flow of water to the reaction chamber Cg (see Fig. 1).

Nineteen and one-half minutes after the re-starting of motor Mt', cam 244 on shaft 200 will cause the opening of switch 246 (line 7), thus the circuit to the alarm 250 in line 7, and the amber and green signal lights 241 and 243 (lines 5 and 6 respectively), will be cut out thereby preventing the sounding of alarm 250 (line 7) or the illumination of these signal lights when the automatic motor starter relays 242 (line 21) and 234 (line 23) are subsequently de-energized by the opening of switches 238 and 230 (line 22).

Fifteen seconds after switch 246 (line 7) has been opened, or nineteen and three-quarter minutes after the restarting of motor Mt', cam 282 on shaft 200 will close switch 224 (line 13), and simultaneously therewith cam 236 on shaft 200 will open switch 238 (line 22). The opening of switch 238 (line 22) causes the de-energization of automatic motor starter relay 242 (line 21), and the main contacts 242a (line 32) of the motor Ma (line 34) will be opened causing this motor to stop, thus stopping the generator agitator assembly Ag (see Fig. 1). Likewise, the de-energization of relay 242 (line 21) will effect the opening of the interlock contact 242b (line 17) and the closing of interlock contacts 242c, 242d (lines 5 and 7 respectively).

One-half minute after the opening of switch 246 (line 7), or twenty minutes after the re-starting of motor Mt', cam 228 on shaft 200 will cause the opening of switch 230 (line 22), thus de-energizing automatic motor starter relay 234 (line 23). The de-energization of relay 234 will cause the opening of switches 234a (line 32) of motor Ms, thereby stopping lime agitator assembly Al (see Fig. 1). Additionally, the de-energization of relay 234 (line 23) will effect the opening of contact 234b (line 25) and the closing of contacts 234c, 234d (lines 6 and 8 respectively).

The generating plant of Fig. 1 will then be completely shut down. Twenty and one-quarter minutes after the re-starting of motor Mt', cam 276 on shaft 200 will open switch 278 (line 15) causing the motor Mt' to stop, and extinguishing the amber signal light 290 (line 15).

The time controller T', as well as all of the electrically operated units of the generating plant of Fig. 1, will then have gone through a complete cycle of operation, and will remain idle until the bell 17 of the gas holder Hg drops to its lower operating limit due to the consumption of acetylene gas thereby closing switch 214 (line 2) which will begin a new cycle by starting the various units of the plant.

Referring specifically to Fig. 4, wherein the development of the eight cams on shaft 200 are disclosed, cam 282 is adapted to maintain a closed circuit for motor Mt' through switch 224 for a period of sufficient extent to set all of the units of the generating plant into operation. The total time necessary to accomplish this is approximately four and one-half minutes. Since shaft 200 rotates through one revolution in twenty-five minutes, cam 282 is set to open switch 224 at 65°, and to effect closing of switch 224 at 355° of the revolution of shaft 200. Cam 276 is adapted to maintain a closed circuit through motor Mt' and switch 278, when switch 222 is moved to its solid line position by the filling of the gas holder Hg, for a sufficient length of time to stop the various units of the plant in a predetermined timed sequence. Cam 276, therefore, is set to close at 60°, and to open at 360°—the 300° of the revolution of shaft 200 requires approximately twenty and one-half minutes within which to stop the generator units.

The previously described timed sequential order of starting and stopping the various units is obtained by setting the remaining cams on shaft 200 as follows:

Cam 228—closes at 3°—opens at 357°.
Cam 236—closes at 6°—opens at 354°.
Cam 244—closes at 9°—opens at 351°.
Cam 252—closes at 25°—opens at 95°.
Cam 270—closes at 45°—opens at 100°.
Cam 260—closes at 30°—opens at 90°.

Referring again to the circuit for the lime-conveyor motor M1, and when switch 84 (line 25) is closed, if automatic starter relay 231 (line 24) should either fail to become energized or should become de-energized as a result of its holding coil burning out or its thermal overload relays 231c, 231d (line 24) tripping, interlock contact 231b (line 25) will close. This will cause the blue signal 233 (line 26) to become illuminated and the time relay 235 (line 25) to become energized. Relay 235 includes a normally open delayed closing contact 235a (line 11) which will be closed upon energization of relay 235. Closing of switch 235a (line 11) will cause the sounding of alarm 250 (line 7) and the energization of the relay 237 (line 11). Relay 237 includes normally closed contact 237a (line 19), which opens upon the energization of relay 237, thus stopping the feed of carbide and water to the reaction chamber Cg (see Fig. 1).

From the foregoing description of the intercontrol between the automatic motor starter relays 258 (line 18), 242 (line 21), 234 (line 23), and 231 (line 24), and the alarm 250 (line 7), the latter will sound in the event any of these relays become de-energized other than in the natural sequence of the plant operation, or by the tripping of circuit breaker 204 (line 30). For example, if the relay 242 (line 21) should become de-energized other than in its natural sequence, contacts 242c, 242d (lines 5 and 7 respectively) will close, thus causing alarm 250 (line 7) to sound, and amber light 241 (line 5) to become illuminated. The alarm 250 may be cut out by momentarily closing push-button contact 292 (line 9), which will effect energization of relay 294 (line 10), and the illumination of red signal light 296 (line 9). Energization of relay 294 (line 10) causes the closing of normally open contact 294a (line 10) and the opening of normally closed contact 294b (line 7), thus cutting out alarm 250. Inasmuch as contact 294a (line 10) has been closed by the energization of relay 294, red signal light 296 (line 9) will remain illuminated and contact 294b (line 7) will remain open. This condition will prevail until relay 242 (line 21) has been repaired and becomes energized again, at which time the contacts 242c, 242d (lines 5 and 7 respectively) will be opened. Opening of contact 242d (line 7) will cause the de-energization of relay 294 (line 10), thus opening contact 294a (line 10) and closing contact 294b (line 7). The opening and closing of these last-mentioned contacts extinguishes the red signal 296 (line 9) and places the alarm 250 (line 7) in condition to sound the next time that any of the automatic motor starting relays above-mentioned become de-energized other than in the natural sequence of operation of the entire generating plant.

For the purpose of permitting the operator to manually control any item of the various electrically operated control units of the generating plant, a series of push-button switches is provided throughout the electrical circuit, and these switches are located at convenient places so that the operator may conveniently open and close any desired circuit. Thus, push-button switch 298 (line 27) provides a means for quickly stopping all moving parts of the generator; push-button switch 300 (line 24) provides a means for starting or stopping the lime conveyor motor M1 at any time; push-button switch 302 (line 23) provides means for starting or stopping the lime agitator assembly motor Ma at any time; push-button switch 304 (line 21) provides a means for starting or stopping the generator agitator paddle assembly motor Ma at any time; push-button switch 306 (line 18) provides a means for starting or stopping the carbide feed motor Mc at any time when the generator agitator paddle assembly motor Ma is in motion; push-button switch 308 (line 16) provides a means for starting or stopping the solenoid water valve 38 (line 16) at any time when the motor Ma is in operation; push-button switch 292 (line 9) provides a means for shutting off alarm 250 (line 7) after it has sounded; push-button switch 310 (line 4) provides a means for starting or stopping the generating plant regardless of the position of the bell 17 of the gas holder Hg; and push-button switch 312 (line 16) provides a means whereby the motor Ma for the generator agitator assembly may be kept in operation at all times by making it independent of the automatic control system.

From the foregoing description of the electric circuit disclosed in Fig. 3 of the drawings, it is apparent that a fully automatic electric control system has been provided for the generating plant of Fig. 1, which system is adapted to initiate the sequential operation of the various electrical control units of the generating plant in an order similar to that effected by the semi-automatic control system disclosed in Fig. 2.

Although the various features of a specific type of acetylene generating plant and electrical control systems therefor have been shown and described in detail to fully disclose two embodiments of the invention, it will be evident that the principles of the invention may be applied to other types of generators and other types of control systems, that numerous changes may be made in the described details, and certain features may be used without others, without departing from the principles of the invention.

What is claimed is:

1. An acetylene generating plant including, in combination, an acetylene generating chamber; electrically operated means for feeding calcium carbide and controlled amounts of water into said generating chamber; electrically operated means for agitating the mixture of materials within said generating chamber; means for collecting the acetylene gas; means for collecting the dry residue produced by the reaction of the carbide and water; electrically operated means for agitating the collected residue; electrically operated conveying means for removing the dry residue from the residue collecting means at a rate which will automatically retain sufficient residue within said residue collecting means at all times to provide a seal therein; and electric interlocking control circuits for all of said electrically operated means for insuring the starting of the respective electrically operated means in accordance with a predetermined sequential order.

2. An acetylene generating plant as claimed in claim 1, in which said electric interlocking circuits comprise automatic starter switch relays for all of said electrically operated means, the holding coil circuits of said relays being interlocked in a manner to require starting of each of said electrically operated means in accordance with a predetermined sequential order.

3. An acetylene generating plant as claimed in claim 1, in which said electric interlocking circuits comprise automatic starter switch relays for all of said electrically operated means, the holding coil circuits of said relays being interlocked in a manner to render the operation of certain of said electrically operated means dependent upon the operation of certain other of said electrically operated means.

4. An acetylene generating plant including, in combination, an acetylene generating chamber; electrically operated means for feeding calcium carbide into said generating chamber; electrically operated means for feeding controlled amounts of water into said generating chamber; electrically operated means for agitating the mixture of materials within said generating chamber; means for collecting the acetylene gas; means for collecting the dry residue produced by the reaction of the calcium carbide and water; electrically operated means for agitating the collected residue; electrically operated conveying means for removing the dry residue from the residue-collecting means at a rate which will automatically retain sufficient residue within said residue-collecting means at all times to provide a seal therein; electric interlocking control circuits for all of said electrically operated means for insuring the starting of the respective electrically operated means in accordance with a predetermined sequential order; separate motors for operating the residue-agitating and residue-conveying means, and said electric interlocking circuits including automatic starter switch relays for such motors, the holding coil circuit of the relay for the residue-agitator motor including a normally open push-button switch and a solenoid, the holding coil circuit of the relay for the residue-conveyor motor including a normally open switch adapted to be closed upon energization of said solenoid, and a level control switch, the opening and closing of which is dependent upon the level of residue within said residue-collecting means, whereby the closing of said push-button switch starts the motor for said residue-agitating means, and the motor for said residue-conveying means automatically starts and stops in accordance with the level of the residue in said residue-collecting means only if the motor for said residue-agitating means is operating.

5. An acetylene generating plant including, in combination, an acetylene generating chamber; electrically operated means for feeding calcium carbide into said generating chamber; electrically operated means for feeding controlled amounts of water into said generating chamber; electrically operated means for agitating the mixture of materials within said generating chamber; means for collecting the acetylene gas; means for collecting the dry residue produced by the reaction of the calcium carbide and water; electrically operated means for agitating the collected residue; electrically operated conveying means for removing the dry residue from the residue-collecting means at a rate which will automatically retain sufficient residue within said residue-collecting means at all times to provide a seal therein; electric interlocking control circuits for all of said electrically operated means for insuring the starting of the respective electrically operated means in accordance with a predetermined sequential order; separate motors for operating the residue-agitating, and the generating chamber agitating means; and said electric interlocking circuits including automatic starter switch relays for such motors, the holding coil circuit of the relay for the residue-agitating motor including a normally open push-button switch, and the holding coil circuit of the relay for the generating chamber agitating motor including a normally open push-button switch, said last-mentioned holding coil circuit being interlocked through said last-mentioned push-button switch with the holding coil circuit of the relay for the residue-agitating motor, whereby the motor for the residue-agitating means must be started before starting the motor for the generating chamber agitating means.

6. An acetylene generating plant including, in combination, an acetylene generating chamber; electrically operated means for feeding calcium carbide into said generating chamber; electrically operated means for feeding controlled amounts of water into said generating chamber; electrically operated means for agitating the mixture of materials within said generating chamber; means for collecting the acetylene gas; means for collecting the dry residue produced by the reaction of the calcium carbide and water; electrically operated means for agitating the collected residue; electrically operated conveying means for removing the dry residue from the residue-collecting means at a rate which will automatically retain sufficient residue within said residue-collecting means at all times to provide a seal therein; electric interlocking control circuits for all of said electrically operated means for insuring the starting of the respective electrically operated means in accordance with a predetermined sequential order; separate motors for operating the residue-agitating, the residue-conveying, and the generating chamber agitating means; said electric interlocking circuits including automatic starter switch relays for such motors, the holding coil circuit of the relay for the residue-agitator motor including a normally open push-button switch and a solenoid, the holding coil circuit of the relay for the residue-conveyor motor including a normally open switch adapted to be closed upon energization of said solenoid, and a level-control switch, the opening and closing of which is dependent upon the level of residue within said residue-collecting means; and the holding coil circuit of the relay for the generating chamber agitator motor including a normally open push-button switch, said last-mentioned holding coil circuit being interlocked through said last-mentioned push-button switch with the holding coil circuit of the relay for the residue-agitator motor, whereby the motor for the residue-agitating means must be started and the motor for the residue-conveying means must be in condition to start before starting the motor for the generating chamber agitating means, the operation of the residue-conveyor motor depending upon the level of the residue within said residue-collecting means.

7. An acetylene generating plant including, in combination, an acetylene generating chamber; electrically operated means for feeding calcium carbide into said generating chamber; electrically operated means for feeding controlled amounts of water into said generating chamber; electrically operated means for agitating the mixture of materials within said generating chamber; means for collecting the acetylene gas; means for collecting the dry residue produced by the reaction of the calcium carbide and water; electrically operated means for agitating the collected residue; electrically operated conveying means for removing the dry residue from the residue-collecting means at a rate which will automatically retain sufficient residue within said residue-collecting means at all times to provide a seal therein; electric interlocking control circuits for all of said electrically operated means for insuring the starting of the respective electrically operated means in accordance with a predetermined sequential order; separate motors for operating the residue-agitating, the residue-conveying, and the generating chamber agitating means; said electric interlocking circuits including automatic starter switch relays for such motors, the holding coil circuit of the relay for the residue-agitator motor including a normally open push-button switch and a solenoid, the holding coil circuit of the relay for the residue-conveyor motor including a normally open switch adapted to be closed upon energization of said solenoid, and a level-control switch, the opening and closing of which is dependent upon the level of residue within said residue-collecting means; the holding coil circuit of the relay for the generating chamber agitator motor including a normally open push-button switch, said last-mentioned holding coil circuit being interlocked through said last-mentioned push-button switch with the holding coil circuit of the relay for the residue-agitator motor; and electric signal means including solenoid-operated switches in the circuits of said motors, the circuit of the signal for the residue-conveyor motor including a second switch adapted to be opened and closed in accordance with the level of the residue within said residue-collecting means, whereby the motor for the residue-agitating means must be started and the motor for the residue-conveying means must be in condition to start before starting the motor for the generating chamber agitating means, the operation of the residue-conveyor motor and the signal therefor depending upon the level of the residue within said residue-collecting means.

8. An acetylene generating plant including, in combination, an acetylene generating chamber; electrically operated means for feeding calcium carbide into said generating chamber; electrically operated means for feeding controlled amounts of water into said generating chamber; electrically operated means for agitating the mixture of materials within said generating chamber; means for collecting the acetylene gas; means for collecting the dry residue produced by the reaction of the calcium carbide and water; electrically operated means for agitating the collected residue; electrically operated conveying means for removing the dry residue from the residue-collecting means at a rate which will automatically retain sufficient residue within said residue-collecting means at all times to provide a seal therein; electric interlocking control circuits for all of said electrically operated means for insuring the starting of the respective electrically operated means in accordance with a predetermined sequential order; separate motors for operating the residue-agitating means, the residue-conveying means, the generating chamber agitating means, and the carbide feeding means; said interlocking circuits including automatic starter-switch relays for such motors, the circuit for the holding coil of the relay for the generating chamber agitator motor including a normally open push-button switch which is interlocked with the relay for the residue-agitator motor; and the circuit for the holding coil of the relay for the carbide feed motor including two solenoid switches, the solenoid of one of which is interlocked with the circuit of the generating chamber agitator motor, and the solenoid of the other of which is interlocked with the residue-conveyor motor, said circuit for the holding coil of the relay for the carbide feed motor also including a time-operated switch.

9. An acetylene generating plant including, in combination, an acetylene generating chamber; electrically operated means for feeding calcium carbide into said generating chamber; electrically operated means for feeding controlled amounts of water into said generating chamber; electrically operated means for agitating the mixture of materials within said generating chamber; means for collecting the acetylene gas; means for collecting the dry residue produced by the reaction of the calcium carbide and water; electrically operated means for agitating the collected residue; electrically operated conveying means for removing the dry residue from the residue-collecting means at a rate which will automatically retain sufficient residue within said residue-collecting means at all times to provide a seal therein; electric interlocking control circuits for all of said electrically operated means for insuring the starting of the respective electrically operated means in accordance with a predetermined sequential order; separate motors for operating the residue-agitating means, the residue-conveying means, the generating chamber agitating means, and the carbide feeding means; and a solenoid-operated water valve for operating the water feeding means; said interlocking circuits including automatic starter switch relays for such motors, the circuit for the holding coil of the relay for the generating chamber agitator motor including a normally open push-button switch which is interlocked with the relay for the residue-agitator motor; the circuit for the holding coil of the relay for the carbide feed motor including two solenoid switches, the solenoid of one of which is interlocked with the circuit of the generating chamber agitator motor, and the solenoid of the other of which is interlocked with the circuit of the residue-conveyor motor, said circuit for the holding coil of the relay for the carbide feed motor also including a time-operated switch; and the circuit for the solenoid of said water valve including a solenoid-operated switch, the solenoid of which is interlocked with the circuit for the carbide feed motor, the circuit for the solenoid of said water valve also including a time-operated switch.

10. An acetylene generating plant as claimed in claim 1, in which said interlocking circuits include a timing device adapted to be set into operation upon the filling and emptying of the acetylene-collecting means, and adapted to start and stop said carbide and water-feeding means in accordance with a predetermined timed relation.

11. An acetylene generating plant including, in combination, an acetylene generating chamber; electrically operated means for feeding calcium carbide into said generating chamber; electrically operated means for feeding controlled amounts of water into said generating chamber; electrically operated means for agitating the mixture of materials within said generating chamber; means for collecting the acetylene gas; means for collecting the dry residue produced by the reaction of the calcium carbide and water; electrically operated means for agitating the collected residue; electrically operated conveying means for removing the dry residue from the residue-collecting means at a rate which will automatically retain sufficient residue within said residue-collecting means at all times to provide a seal therein; electric interlocking control circuits for all of said electrically operated means for insuring the starting of the respective electrically operated means in accordance with a predetermined sequential order; a motor for operating the carbide-feeding means; a solenoid-operated water valve for operating said water-feeding means; the interlocking circuits including an automatic starter switch relay for the carbide feed motor, and also including the solenoid of said water valve; and a time-operated switch adapted to be set into operation by the action of the acetylene-collecting means and adapted to complete the circuit for the carbide feed motor relay in advance of completing the circuit for the solenoid of said water valve.

12. An acetylene generating plant including, in combination, an acetylene generating chamber; electrically operated means for feeding calcium carbide into said generating chamber; electrically operated means for feeding controlled amounts of water into said generating chamber; electrically operated means for agitating the mixture of materials within said generating chamber; means for collecting the acetylene gas; means for collecting the dry residue produced by the reaction of the calcium carbide and water; electrically operated means for agitating the collected residue; electrically operated conveying means for removing the dry residue from the residue-collecting means at a rate which will automatically retain sufficient residue within said residue-collecting means at all times to provide a seal therein; electric interlocking control circuits for all of said electrically operated means for insuring the starting of the respective electrically operated means in accordance with a predetermined sequential order; separate motors for operating the residue-agitating means, the residue-conveying means, the generating chamber agitating means, and the carbide-feeding means; a solenoid-operated water valve for operating the water feeding means; said interlocking circuits including automatic starter switch relays for such motors, the circuit for the holding coil of the relay for the generating chamber agitator motor including a normally open push-button switch which is interlocked with the relay for the residue-agitator motor; the circuit for the holding coil of the relay for the carbide feed motor including two solenoid switches, the solenoid of one of which is interlocked with the circuit of the generating chamber agitator motor, and the solenoid of the other of which is interlocked with the residue-conveyor motor, said circuit for the holding coil of the relay for the carbide feed motor also including a rotatable time-operated switch; said time-operated switch being adapted to be started by the emptying of the acetylene-collecting means and to rotate through a part of one revolution and then to stop, and to complete the circuit for the carbide feed motor relay in advance of completing the circuit for the solenoid of said water valve, said time-operated switch being adapted to be restarted when said acetylene-collecting means is filled to complete one revolution, to simultaneously stop the carbide feed motor, and to shut off said water valve after a predetermined interval of time.

13. An acetylene generating plant comprising, in combination, an acetylene generator having a reaction chamber; means for feeding calcium carbide and water into said reaction chamber; means for agitating the mixture of materials within said chamber; and a control system for said plant comprising electric interlocking means for insuring the starting of the agitating means prior to the starting of the feeding means, and for insuring the stopping of the feeding means prior to the stopping of the agitating means.

14. An acetylene generating plant as claimed in claim 13, in which said plant is also provided with means for collecting the dry residue produced from the reaction of the calcium carbide and water, and stirring means for agitating the collected residue; and in which said control system includes means for insuring the starting of said stirring means before the starting of the feeding and agitating means.

15. An acetylene generating plant as claimed in claim 13 in which said plant is also provided with means for collecting the dry residue produced by the reaction of the calcium carbide and water, stirring means for agitating the collected residue, means for withdrawing the residue from the collecting means when the residue therein rises above a predetermined level, and means for insuring the starting of the stirring and withdrawing means before the starting of the feeding and agitating means, the operation of said withdrawing means depending on the height of the residue in the collecting means.

16. In an acetylene generating plant having a residue-agitating device, a residue-conveying device, and separate motors for driving said devices, electric interlocking circuits for controlling the operation of said plant comprising, in combination, a timing device; an automatic starter switch relay adapted to be energized by the action of said timing device to thereby start the motor for said residue-agitating device; an automatic starter switch relay adapted to be energized in accordance with the amount of residue being agitated to thereby start the motor for said residue-conveying device; and a normally open switch in one of the circuits for said relays which is closed upon energization of the relay in the other circuit.

17. In an acetylene generating plant having means for feeding calcium carbide and water into a generating chamber, means for agitating the mixture of materials within the generating chamber, and separate motors for driving said means, electric interlocking circuits for controlling the operation of said plant comprising, in combination, a timing device; automatic starter switch relays adapted to be energized by the action of said timing device to thereby start the motors for the agitating means and the carbide and water-feeding means, the circuits for said relays including contacts adapted to be closed and opened in a predetermined sequence by said timing device.

18. In an acetylene generating plant as claimed in claim 17 and having means for feeding carbide and water to a generating chamber and means for agitating the mixture of materials within the generating chamber, and in which said interlocking circuits include automatic starter switch relays for controlling the operation of the mixture agitating means and for controlling the operation of the carbide-feeding means, said interlocking circuits also including means for de-energizing the relay for the carbide-feeding means if the circuit of the relay for the mixture-agitating means becomes interrupted.

19. In an acetylene generating plant as claimed in claim 17 and having a motor-driven conveyer and a solenoid-operated water valve respectively provided for feeding carbide and water to a generating chamber, and in which said interlocking circuits include an automatic starter switch relay for the conveyor motor, and the circuit of the solenoid of said water valve being interlocked with the circuit of the relay for said conveyor motor, whereby the interruption of said conveyor motor circuit effects closing of the water valve.

20. In an acetylene generating plant as claimed in claim 17 and having a motor-driven conveyor and a solenoid-operated water valve respectively provided for feeding carbide and water to a generating chamber, and in which said interlocking circuits include an automatic starter switch relay for the conveyor motor and a second relay adapted to be energized in the event that the relay for said conveyor motor becomes de-energized, said second relay being interlocked with the solenoid of said water valve, whereby said solenoid is de-energized upon energization of said second relay.

21. In an acetylene generating plant as claimed in claim 17 and having means for feeding carbide and water to a generating chamber, and in which the automatic starter switch relay for the residue-conveying device is interlocked with an interrupter relay in such manner that said interrupter relay becomes energized upon de-energization of the starter switch relay for the residue-conveying device to thereby interrupt the circuits controlling the water-feeding means and the carbide-feeding means.

WILLIAM G. TUEL.
CHESTER A. SIVER.

CERTIFICATE OF CORRECTION.

Patent No. 2,263,658. November 25, 1941.

WILLIAM G. TUEL, ET AL.

It is hereby certified that error appears in the printed specification of the above numbered patent requiring correction as follows: Page 6, second column, lines 71 and 75, for "line" read --lime--; page 7, first column, line 26, for "relay" read --relays--; page 12, first column, line 35, and second column, lines 6, 18 and 31, claims 18, 19, 20 and 21 respectively, for the claim reference number "1" read --16--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.